United States Patent Office 3,396,574
Patented Aug. 13, 1968

3,396,574
APPARATUS FOR DETERMINING THE CONDENSATION TEMPERATURE OF A VAPOR IN A GAS
Walter Hanlein, Erlangen, and Joachim Rupprecht, Nuremberg, Germany, assignors to Siemens Aktiengesellschaft, Munich, Germany, a corporation of Germany
Filed July 9, 1965, Ser. No. 470,810
Claims priority, application Germany, July 17, 1964, S 92,095
8 Claims. (Cl. 73—17)

ABSTRACT OF THE DISCLOSURE

A measuring body having a condensation surface is positioned in a gas, a cooling body includes heat resistance and cooperates with the measuring body for continuously removing heat from the measuring body through the heat resistance and maintains a determined temperature difference between the measuring body and the cooling body. A measuring device in operative proximity with the heat resistance measures temperature. A control arrangement connected to the measuring device and cooperating with the measuring body and the heat resistance energizes the measuring device at the instant that the determined temperature difference varies due to the appearance of condensation temperature at the condensation surface of the measuring body. The control arrangement comprises a first thermocouple element having a sensing junction contacting the measuring body and a second thermocouple element having a sensing junction spaced from the first thermocouple element and contacting the cooling body. The first and second thermocouple elements are connected in series opposing relation to form a differential thermocouple element for generating an electrical control signal upon the appearance at the condensation surface of the condensation temperature. A switch is connected to energize the measuring body and a switch control applies the electrical control signal to the switch to energize the measuring device.

The present invention relates to apparatus for determining the condensation temperature of a vapor in a gas. More particularly, the present invention relates to apparatus for determining the condensation temperature of a vapor in a gas by utilizing the heat of condensation to indicate the proper instant for such determination.

In a known method of this type, the point of condensation is determined by an optical system. In such a system, the condensation surface of the measuring body is developed as a mirror and thus functions to reflect a ray of light at a photocell. The condensate which forms on the mirror at the start of condensation disperses the light ray and thereby varies the output of the photocell. The variation in output or change in resistance of the photocell provides a release signal in a circuit for measuring the temperature of the measuring body.

The known method does not provide an accurate measurement of the condensation temperature, because the dispersion of light depends upon the thickness of the condensate on the mirror surface and gradually exceeds the point at which there is sufficient light to cause a response by the photocell. Furthermore, the known method is prone to disturbances, since a layer of dust on the mirror surface may cause dispersion of the light and provide a measurement indication which is completely erroneous.

The principal object of the present invention is to provide a new and improved apparatus for determining the condensation temperature of a vapor in a gas.

An object of the present invention is to provide apparatus for determining the condensation temperature of a vapor in a gas with great accuracy.

Another object of the present invention is to provide apparatus for determining the condensation temperature of a vapor in a gas efficiently, effectively, and reliably.

In accodance with the present invention, the increase in temperature, which is the condensation temperature, and which appears at the start of condensation, is utilized to determine the instant at which the condensation temperature is measured.

In accordance with the present invention, apparatus for determining the condensation temperature of a vapor in a gas comprises a measuring body having a condensation surface position in the gas. A cooling device including heat resistance cooperates with the measuring body for continuously removing heat from the measuring body through the heat resistance and maintains a determined temperature difference between the measuring body and the cooling means. A measuring device in operative proximity with the heat resistance measures temperature. A control network connected to the measuring device and cooperating with the measuring body and the heat resistance energizes the measuring device at the instant that the determined tempertature difference varies due to the appearance of the condensation temperature at the condensation surface of the measring body.

In order that the present invention may be readily carried into effect, it will now be described with reference to the accompanying drawing, wherein.

In the figures the same components are identified by the same reference numerals.

Figure 1:
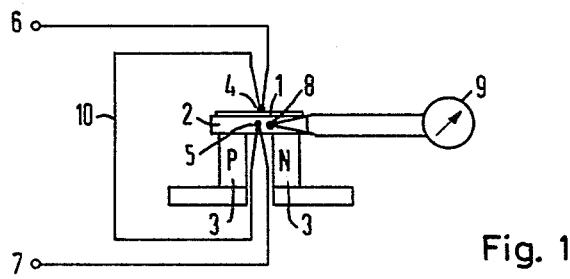
FIG. 1 is a schematic diagram of an embodiment of apparatus of the present invention for determining the condensation temperature of a vapor in a gas.

In FIG. 1, a measuring body 1 is positioned on a "cold" connecting bridge 2 of a Peltier element 3 in heat conductive relationship. The bridge 2 of the Peltier element 3 functions as a cooling body. The measuring body 1 may comprise a flat copper disc with a smooth surface which functions as the condensation surface. The connecting bridge 2 of the Peltier element comprises constantan which has a poor heat conductance so that it provides an effective heat resistance between the measuring sensing junctions 4 and 5 of two thermocouple elements.

The cooling body 2 of the Peltier element 3 continuously removes heat from the measuring body 1 via the heat resistance of said cooling body. The thermocouple elements are electrically connected in series-opposing relation, so that the combination of said thermocouple elements functions as a differential thermocouple element having terminals 6 and 7 at which the temperature difference, effective at the heat resistance, is indicated.

The sensing junction 8 of another thermocouple element is positioned in operative contact with the connecting bridge 2 of the Peltier element as close as possible to the sensing junction 5. The additional thermocouple element serves to measure the absolute temperature value of the connecting bridge 2 of the Peltier element 3, which temperature is indicated by instrument 9. This temperature virtually corresponds, during the slow continuous cooling process, to the temperature of the measuring body 1.

In operation, the Peltier element 3 of any suitable type, which may comprise, for example, a Peltier element of the type described in McGraw-Hill Encyclopedia of Science and Technology, vol. 13, McGraw-Hill Book Company, Inc., 1960, pp. 580 and 581, and the measuring body 1 are brought by any suitable means to a point at which the temperature of said Peltier element, and thus of said measuring body, is brought to a value above the condensation temperature. Then, heat is continuously removed from the measuring body 1 through slow cooling of said measuring body by the Peltier element 3. When the condensation temperature is reached, condensate forms on the condensation surface of the measuring body 1 and produces heat, which is the heat of condensation, at said condensation surface.

During cooling of the measuring body 1, a determined temperature difference is maintained between the measuring body 1 and the heat resistance and cooling bridge 2. The determined temperature difference may be substantially zero. When the condensation temperature appears at the condensation surface of the measuring body 1, the determined temperature difference varies. The temperature difference produced by the appearance of the condensation temperature is greater than zero when the determined temperature difference is initially substantially zero.

The variation or increase in the temperature difference between the measuring body 1 and the cooling body 2, due to the condensation temperature at the condensation surface of said measuring body, produces an electrical signal at the terminals 6 and 7 of the differential thermocouple element. The electrical signal provided at the terminals 6 and 7 functions as a control signal to energize the temperature-measuring instrument 9 to measure the condensation temperature at the instant that said condensation temperature appears.

Figure 4:
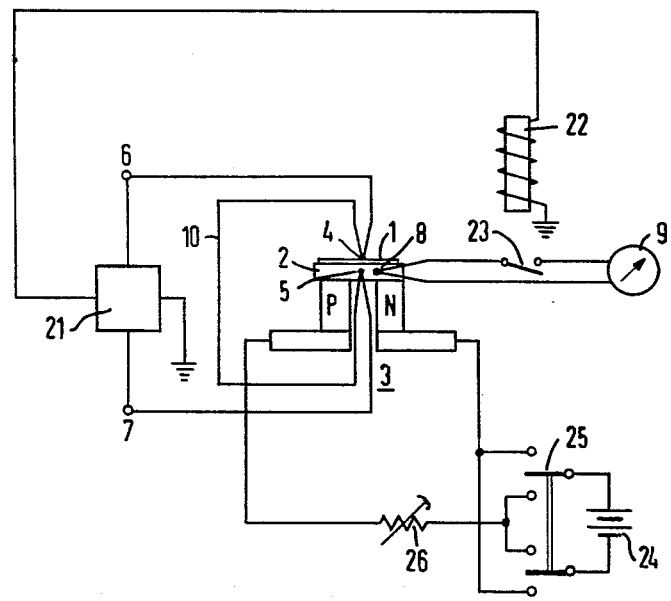
FIG. 4 is a schematic diagram of the embodiment of FIG. 1 showing details omitted from FIGS. 1 to 3 in the interest of maintaining the clarity of illustration.

The control of the temperature-measuring instrument 9 by the electrical control signal provided at the terminals 6 and 7 may be accomplished by any suitable means such as, for example, that shown in FIG. 4. In FIG. 4, the electrical control signal provided at the terminals 6 and 7 upon the appearance of the condensation temperature at the condensation surface of the measuring body 1, is utilized to energize a relay 22 having a normally open switch 23 after suitable amplification in an amplifier 21. When the relay 22 is energized, it closes the switch 23 and thereby closes the energization circuit of the temperature-measuring instrument 9 to the sensing member 8 of the third thermocouple element.

The heating and cooling functions of the Peltier element 3 result from the connection of such Peltier element to an alternating polarity current source such as, for example, a current source or battery 24 and a polarity reversing switch 25, as shown in FIG. 4. A variable resistor 26 is connected in the circuit to permit regulation of the current intensity.

The most accurate measurement of the condensation temperature is attained if the cooling of the measuring body 1 progresses so slowly that the increase in temperature difference between said measuring body and the cooling body 2 occurs exactly at the sensitivity or response threshold of the differential thermocouple element 4, 5. If cooling progresses more rapidly, a greater temperature difference occurs. Due to the position of the sensing member 8 of the third thermocouple element, however, such greater temperature difference, as indicated by the temperature-measuring instrument 9, is in error.

In the embodiment of FIG. 1, the poor heat conducting characteristic of the cooling body 2 is utilized as the heat resistance, so that the heat resistance and the cooling body are combined in one body.

Figure 2:
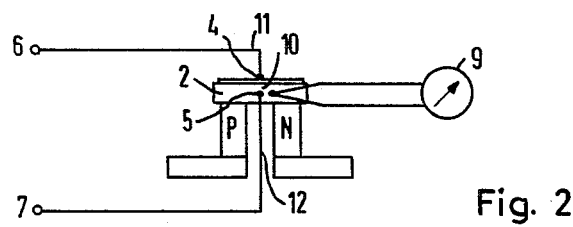
FIG. 2 is a modification of the embodiment of FIG. 1.

FIG. 2 is a modification of the embodiment of FIG. 1 in which the electrical connection 10 between corresponding junction members of each of the first and second thermocouple elements is replaced by the portion of the cooling bridge 2 between the sensing junctions of said first and second thermocouple elements. The connecting bridge or cooling body 2 of the Peltier element 3 thus functions as the cooling body, as the heat resistance and as an electrical connection between the corresponding junction members of the first and second thermocouple elements connected as the differential thermocouple element. Such electrical connection is indicated as an electrical conductor 10 in FIG. 1 and is, in FIG. 2, the electrically conductive portion of the cooling body 2 between the sensing junctions 4 and 5 of the first and second thermocouple elements. In the modification of FIG. 2, it is necessary that the connecting bridge 2 and the electrical conductors 11 and 12 comprise different materials, so that thermo voltage may be produced at the sensing junctions 4 and 5. The electrical conductors 11 and 12 may comprise, for example, copper, and the connecting bridge 2 may comprise constantan as in FIG. 1.

Figure 3:
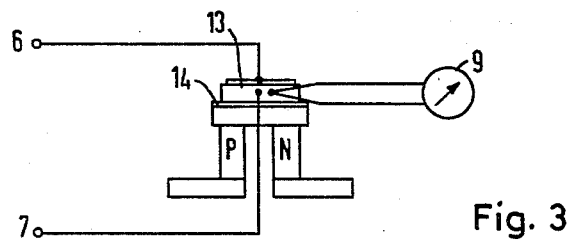
FIG. 3 is another modification of the embodiment of FIG. 1.

FIG. 3 is another modification of the embodiment of FIG. 1. In FIG. 3, the electrical connection between the corresponding junction members of the first and second thermocouple elements is a separate body 13, rather than the electrical conductor 10 of the embodiment of FIG. 1 or the portion 10 of the connecting bridge 2 of the Peltier element of the modification of FIG. 2. In order to increase the sensitivity of the differential thermocouple element 4, 5 and thereby increase the accuracy of determination of the instant at which condensation starts it is often desirable to utilize a material of great thermal power as the material of thermocouple elements. It is undesirable to utilize the material of the connecting bridge 2 of the Peltier element 3 for this purpose, as in the modification of FIG. 2.

In FIG. 3, in order to avoid the utilization of the material of the connecting bridge 2 of the Peltier element 3 as the material of the thermocouple elements, a separate electrically conductive body 13 is positioned on said connecting bridge and functions as the electrical connection between the corresponding junction members of each of the first and second thermocouple elements. The electrical connecting body 13 is separated from the connecting bridge 2 of the Peltier element by a foil, body, plate or the like 14 which comprises material having good heat conductance and which is interposed between the measuring body 1 and said connecting bridge.

In the apparatus of the present invention, a suitable magnitude of the heat resistance is preferably so small that during the slow cooling process the measuring body 1 and the cooling body 2 are at approximately the same temperature. The temperature difference between the measuring body 1 and the cooling body 2 at the instant at which condensation starts is usually so small that any error in the indication of the temperature-measuring instrument 9 is very small. Furthermore, the heat resistance prevents additional stress on the measuring body 1. Such additional stress would weaken the temperature increase due to condensation.

While the invention has been described by means of specific examples and in specific embodiments, we do not wish to be limited thereto, for obvious modifications will occur to those skilled in the art without departing from the spirit and scope of the invention.

We claim:

1. Apparatus for determining the condensation temperature of a vapor in a gas, comprising
    a measuring body having a condenstion surface positioned in said gas;
    cooling means including heat resistance cooperating with said measuring body for continuously removing heat from said measuring body through said heat resistance and maintaining a determined temperature difference between said measuring body and said cooling means;
    measuring means in operative proximity with said heat resistance for measuring temperature; and
    control means connected to said measuring means and cooperating with said measuring body and said heat resistance for energizing said measuring means at the instant that said determined temperature difference varies due to the appearance of said condensation temperature at the condensation surface of said measuring body, said control means comprising a first thermocouple element having a sensing junction contacing said measuring body and a second thermocouple element having a sensing junction spaced from the sensing junction of said first thermocouple element and contacting said cooling means, connecting means connecting said first and second thermocouple elements in series opposing relation to form a differential thermocouple element for generating an electrical control signal upon the appearance at said condensation surface of said condensation temperature, switching means connected to energize said measuring means and switching control means for applying said electrical control signal to said switching means to energize said measuring means.

2. Apparatus for determining the condensation temperature of a vapor in a gas, comprising
an electrically conductive body;
a measuring body having a condensation surface positioned on said electrically conductive body in said gas;
cooling means including heat resistance cooperating with said electrically conductive body for continuously removing heat from said measuring body through said electrical conductive body;
measuring means in operative proximity with said electrically conductive body for measuring temperature; and
control means connected with said measuring means and cooperating with said measuring body and said electrically conductive body for energizing said measuring means at the instant that the condensation temperature appears at the condensation surface of said measuring body, said control means comprising a first thermocouple element having a sensing junction contacting said measuring body and a second thermocouple element having a sensing junction spaced from the sensing junction of said first thermocouple element and contacting said electrically conductive body, connecting means connecting said first and second thermocouple elements in series opposing relation to form a differential thermocouple element for generating an electrical control signal upon the appearance at said condensation surface of said condensation temperature, switching means connected to energize said measuring means and switching control means for applying said electrical control signal to said switching means to energize said measuring means.

3. Apparatus for determining the condensation temperature of a vapor in a gas, comprising
a measuring body having a condensation surface positioned in said gas;
cooling means including heat resistance cooperating with said measuring body for continuously removing heat from said measuring body through said heat resistance and maintaining a determined temperature difference between said measuring body and said cooling means, said cooling means comprising a Peltier element having a connecting bridge inherently including said heat resistance and said measuring body being positioned on the connecting bridge of said Peltier element;
measuring means in operative proximity with said heat resistance for measuring temperature; and
control means connected to said measuring means and cooperating with said measuring body and said heat resistance for energizing said measuring means at the instant that said determined temperature difference varies due to the appearance of said condensation temperature at the condensation surface of said measuring body, said control means comprising a first thermocouple element having a sensing junction contacting said measuring body and a second thermocouple element having a sensing junction spaced from the sensing junction of said first thermocouple element and contacting the connecting bridge of said Peltier element, connecting means connecting said first and second thermocouple elements in series opposing relation to form a differential thermocouple element for generating an electrical control signal upon the appearance at said condensation surface of said condensation temperature, switching means connected to energize said measuring means and switching control means for applying said electrical control signal to said switching means to energize said measuring means.

4. Apparatus as claimed in claim 3, wherein said measuring means comprises temperature indicating means, a third thermocouple element having junction members forming a sensing junction in contact with the connecting bridge of said Peltier element and means connecting the junction members of said third thermocouple element to said temperature indicating means via said switching means.

5. Apparatus as claimed in claim 3, wherein each of said first and second thermocouple elements has a pair of junction members forming the sensing junction thereof and the connecting means of said control means comprises an electrical conductor connected between corresponding junction members of said first and second thermocouple elements.

6. Apparatus as claimed in claim 3, wherein each of said first and second thermocouple elements has a pair of junction members forming the sensing junction thereof and the connecting means of said control means comprises a portion of the connecting bridge of said Peltier element between the sensing junctions of said first and second thermocouple elements.

7. Apparatus as claimed in claim 3, wherein each of said first and second thermocouple elements has a pair of junction members forming the sensing junction thereof and the connecting means of said control means comprises an electrically conductive body positioned on the connecting bridge of said Peltier element and electrically connecting corresponding junction members of said first and second thermocouple elements.

8. Apparatus as claimed in claim 7, further comprising a layer of good heat conducting material interposed between said measuring body and said connecting bridge.

References Cited
UNITED STATES PATENTS 2,680,371    6/1954    Donath _____ 73—17
3,293,901   12/1966    Van Scoyoc et al. _____ 73—17

JAMES J. GILL, *Primary Examiner.*

EDDIE E. SCOTT, *Assistant Examiner.*